United States Patent
Ramamurthy et al.

(10) Patent No.: US 8,989,124 B1
(45) Date of Patent: Mar. 24, 2015

(54) MANAGEMENT OF BEARERS IN A CELLULAR WIRELESS COMMUNICATION SYSTEM

(71) Applicant: Sprint Spectrum L.P., Overland Park, KS (US)

(72) Inventors: Suryanarayanan Ramamurthy, Olathe, KS (US); Saravana Velusamy, Olathe, KS (US)

(73) Assignee: Sprint Spectrum L.P., Overland Park, KS (US)

(*) Notice: Subject to any disclaimer, the term of this patent is extended or adjusted under 35 U.S.C. 154(b) by 133 days.

(21) Appl. No.: 13/790,478

(22) Filed: Mar. 8, 2013

(51) Int. Cl.
*H04W 4/00* (2009.01)
*H04W 72/04* (2009.01)

(52) U.S. Cl.
CPC .................................. *H04W 72/044* (2013.01)
USPC .......................................................... 370/329

(58) Field of Classification Search
None
See application file for complete search history.

(56) References Cited

U.S. PATENT DOCUMENTS 5,371,534 A  12/1994  Dagdeviren et al.
6,553,220 B1  4/2003  Marks
2009/0089144 A1*  4/2009  Hodge, Jr. ........................ 705/10
2012/0165013 A1*  6/2012  Nishida et al. ............. 455/435.1
2012/0182912 A1  7/2012  Watfa et al.
2012/0236709 A1*  9/2012  Ramachandran et al. .... 370/221

OTHER PUBLICATIONS

"3rd Generation Partnership Project; Technical Specification Group Services and System Aspects; General Packet Radio Service (GPRS) enhancements for Evolved Universal Terrestrial Radio Access Network (E-UTRAN) access (Release 9)," 3GPP TS 23.401, V9.10.0 (Sep. 2011).

"Digital cellular telecommunications system (Phase 2+); Universal Mobile Telecommunications System (UMTS); LTE; Circuit Switched (CS) fallback in Evolved Packet System (EPS); Stage 2 (3GPP TS 23.272 version 10.3.1 Release 10)," ETSI TS 123 272, V10.3.1 (Apr. 2011).

* cited by examiner

*Primary Examiner* — Afshawn Towfighi (57) ABSTRACT

Management of bearers in a communication system. A network may establish for a user equipment device (UE) a first bearer of a first type. Thereafter, upon establishment of a bearer of a second type for the UE, the network may automatically release the first bearer of the first type. In turn, when the UE finishes communication on the bearer of the second type, the network may not only release that bearer of the second type but may automatically establish for the UE a second bearer of the first type.

20 Claims, 4 Drawing Sheets

MANAGEMENT OF BEARERS IN A CELLULAR WIRELESS COMMUNICATION SYSTEM

BACKGROUND

Unless otherwise indicated herein, the materials described in this section are not prior art to the claims and are not admitted to be prior art by inclusion in this section.

A cellular wireless network may include a number of base stations that radiate to define wireless coverage areas, such as cells and cell sectors, in which user equipment devices (UEs) such as cell phones, tablet computers, tracking devices, embedded wireless modules, and other wirelessly equipped communication devices, can operate. In turn, each base station may be coupled with network infrastructure that provides connectivity with one or more transport networks, such as the public switched telephone network (PSTN) and/or a packet-switched network such as the Internet for instance. With this arrangement, a UE within coverage of the network may engage in air interface communication with a base station and may thereby communicate via the base station with various remote network entities or with other UEs.

When a cellular wireless network serves UEs, the network may allocate various resources to facilitate communication to and from the UEs. In an example arrangement, for instance, the network may allocate "bearers" that define physical or logical communication channels extending between the UEs and a transport network. Each such bearer may include a radio-bearer component that extends between a UE and a serving base station and an access-bearer component that extends between the serving base station and the transport network. Further, each such bearer may have an associated service level, such as "best effort" or "guaranteed bit rate" for instance, to support a particular quality of service or type of service. In practice, the network may then allocate a number of such bearers for a UE, to support various different types of communication services.

By way of example, when the UE first enters into coverage of a base station, the UE may engage in a registration or "attachment" process that causes the network to allocate for the UE certain default bearers in accordance with the UE's service profile. For instance, if the UE's service profile indicates that the UE supports general packet-data communication (such as web browsing, file transfer, and the like), the network may allocate for the UE a default bearer for carrying such communications with a best-effort service level. Further, if the UE's service profile indicates that the UE supports voice over Internet Protocol (VoIP) communications or other such real-time packet-based communication service, the network may allocate for the UE a default bearer to support Session Initiation Protocol (SIP) signaling or the like to facilitate setup of such communications.

In turn, as a UE is being served by a base station, if the UE is going to engage in another type of communication service, the network may allocate for the UE still other bearers, possibly with other service levels. For instance, if the UE supports VoIP service and seeks to engage in a VoIP call, or a VoIP call server seeks to connect a call to the UE, the network may allocate for the UE a dedicated bearer having a guaranteed bit rate and perhaps other high service level attributes, to carry the VoIP bearer traffic (e.g., packets representing voice), and the UE may then engage in the VoIP call via that bearer. Further, if the UE supports online gaming service and seeks to engage in gaming communication, the network may allocate for the UE a dedicated bearer having a particular service level appropriate for that gaming communication, and the UE may then engage in the gaming via that bearer.

Overview

Depending on the network arrangement and other factors, the network may have a limited number of bearers that it can allocate as a general matter and perhaps a limited number of bearers that it can allocate on a per-UE basis. In an example arrangement, for instance, network infrastructure vendors may impose a limit on the number of simultaneous bearers that the infrastructure will support. Consequently, the network may be unable to allocate more than that number of simultaneous bearers. Further, on a per-UE basis, each bearer may have an associated bearer ID, and there may be a limited number of such IDs. For instance, each bearer ID may be a three bit value, and so a given UE may have no more than eight bearers.

Disclosed herein is a method and corresponding apparatus or system to help manage allocation of bearers. In accordance with the disclosure, when the network has allocated a bearer of a first type for the UE, if the network then allocates a bearer of a second type for the UE, the network will automatically release the bearer of the first type, to conserve bearer resources. In turn, the network will determine when the UE has finished engaging in a communication that used the allocated bearer of the second type, and, in response to that determination, the network will not only release the bearer of the second type but also automatically allocate for the UE a new bearer of the first type.

As a specific example of this process, if the network has allocated to the UE a default bearer for general packet-data communications and the network then allocates for the UE a dedicated bearer for a VoIP call, the network may automatically release the UE's default bearer if the UE will not be engaging in simultaneous voice and data communication. In turn, the network may then determine when the VoIP call ends, and in response to the VoIP call ending, the network may not only release the allocated dedicated bearer but may automatically allocate for the UE a new default bearer for default packet-data communications.

Accordingly, in one respect, disclosed is a method, which may apply in a cellular wireless communication system or in another type of communication system. The representative system may include a gateway system comprising one or more gateways that provide connectivity with a transport network. The method may then involve establishing (allocating) for a UE a first bearer of a first type for carrying bearer traffic between the UE and a gateway system. Further, the method may involve receiving a request to establish for the UE a bearer of a second type for carrying a particular type of bearer traffic between the UE and the gateway system and, response to that request, (i) establishing for the UE the bearer of the second type and (ii) tearing down the first bearer of the first type. In turn, the method may then involve determining that the UE is finished using the bearer of the second type and, responsive to determining that the UE is finished using the bearer of the second type, (i) tearing down the bearer of the second type and (ii) establishing for the UE a second bearer of the first type.

Further, in another respect, disclosed is a method that may similarly apply in a cellular wireless communication system or other type of communication system also including a gateway system that provides connectivity with a transport network. The method may involve establishing for a UE a first default bearer extending between the UE and a gateway system. Further, the method may involve receiving a request to establish for the UE a dedicated bearer for carrying a voice-over-Internet-Protocol (VoIP) call, and, responsive to the, (i) establishing for the UE the dedicated bearer extending between the UE and the gateway system and (ii) tearing down the first default bearer. In turn, the method may then involve determining that the VoIP call has ended and, responsive to the determining, (i) tearing down the dedicated bearer and (ii) establishing for the UE a second default bearer extending between the UE and the gateway system.

Still further, disclosed is a mobility management entity (MME) of the type that may operate in a cellular wireless communication system compliant with the Long Term Evolution (LTE) protocol for instance. The MME may include a network communication interface, a processing unit, data storage, and program instructions stored in the data storage and executable by the processing unit to carry out various functions.

Representative functions may include those discussed above or others to facilitate management of bearers. By way of example, the functions may include receiving via the network communication interface a first request to establish a dedicated bearer for a UE. Further, the functions may include, in response to the first request, engaging in signaling via the network communication interface with one or more network entities to establish the dedicated bearer for the UE and to release a first default bearer that had been established for the UE. Still further, the functions may include subsequently receiving via the network communication interface a second request to release the dedicated bearer. And the functions may then include, in response to the second request, engaging in signaling via the network communication interface with the one or more network entities to release the dedicated bearer and to establish for the UE a second default bearer.

These as well as other aspects, advantages, and alternatives will become apparent to those of ordinary skill in the art by reading the following detailed description, with reference where appropriate to the accompanying drawings. Further, it should be understood that the descriptions provided in this summary and below are intended to illustrate the invention by way of example only and not by way of limitation.

DETAILED DESCRIPTION

As noted above, FIG. 1 is a simplified block diagram of an example network arrangement in which aspects of the present disclosure can be implemented. It should be understood, however, that this and other arrangements and processes described herein are set forth for purposes of example only, and that other arrangements and elements (e.g., machines, interfaces, functions, orders of elements, etc.) can be added or used instead and some elements may be omitted altogether. Further, those skilled in the art will appreciate that many of the elements described herein are functional entities that may be implemented as discrete components or in conjunction with other components, in any suitable combination and location, and that various disclosed functions can be implemented by any combination of hardware, firmware, and/or software, such as by one or more processors programmed to execute computer instructions for instance.

Figure 1:
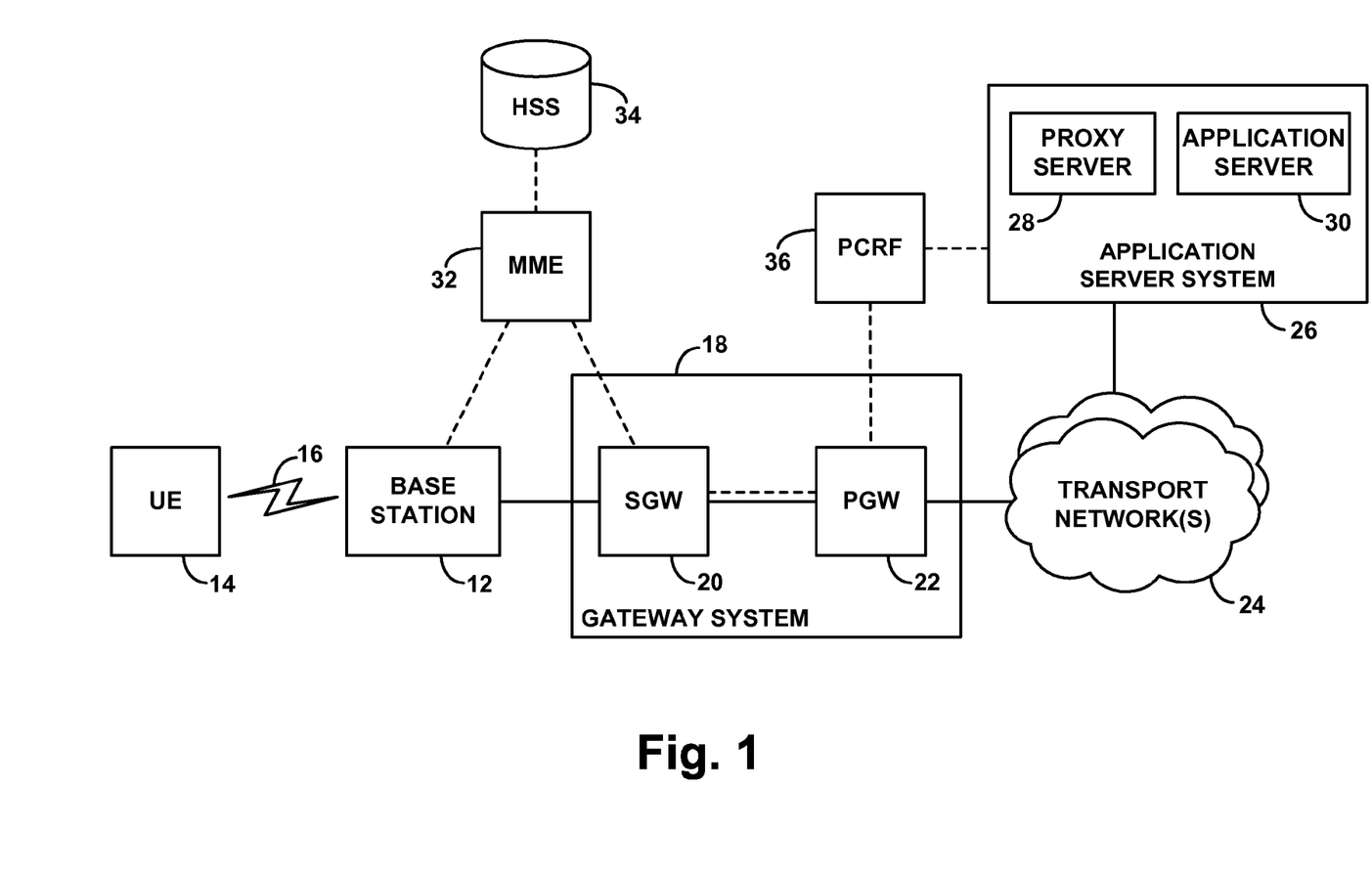
FIG. 1 is a simplified block diagram of a network arrangement in which aspects of the present disclosure can be implemented.

The arrangement of FIG. 1 includes by way of example a representative base station (e.g., eNodeB) 12 and a UE 14 within coverage of the base station 12. The base station and UE may be configured to communicate with each other over a radio frequency air interface 16 according to any of a variety of air interface protocols, examples of which include Orthogonal Frequency Division Multiple Access (OFDMA) (e.g., LTE or Wireless Interoperability for Microwave Access (WiMAX)), Code Division Multiple Access (CDMA), Global System for Mobile Communications (GSM), and others now known or later developed.

As further illustrated, the arrangement includes a gateway system 18 comprising a representative serving gateway (SGW) 20 and a representative packet gateways (PGW) 22. The SGW 20 is configured to communicate with the base station 12 and with the PGWs 22. And the PGW 22 is then arranged to provide connectivity with one or more transport networks 24 such as the public Internet and various private application service networks for instance. Shown sitting on the transport network(s) is then a representative application server system 26 comprising a proxy server 28 and an application server 30, which may support various application services for UEs. By way of example, the application server 30 may be an Internet Multimedia Subsystem (IMS) server configured to provide VoIP services, and the proxy server 28 may be an IMS Call Session Control Function (CSCF).

In addition, the arrangement includes a representative MME 32, which functions as a controller and may be configured to carry out various functions described herein. The MME is configured to communicate with the base station 12 and with the SGW 20. Further, the MME is configured to communicate with a Home Subscriber Server (HSS) 34, which may store account and service profiles for various UEs, and with a Policy Charging and Rules Function (PCRF) 36, which functions as a policy decision point to authorize and control application of service logic by the MME for instance.

In practice, many of these components may be owned and/or operated by or for a telecommunications service provider such as a cellular wireless carrier and may physically sit as nodes on a core packet network operated by the service provider. Communications over the various illustrated interfaces may thus pass between various network entities as packet-based communications, such as IP communications for instance, through the core network. As such, dashed lines may represent logical signaling links for carrying signaling messages such as attach requests and responses and bearer setup messages, and solid lines may represent logical bearer links for carrying bearer data such as web browsing data and VoIP signaling and traffic for instance.

With the example arrangement shown, when UE 14 enters into coverage of base station 12, the UE may transmit an attach request over the air interface 16 to the base station, including one or more parameters in the attach message to indicate that this is an initial attach request for instance. This attach request may then cause the network to establish for the UE one or more default bearers.

In particular, when the base station 12 receives this initial attach request from the UE, the base station may forward the attach request to the MME 32. The MME may then authenticate and authorize the UE and obtain from HSS 34 an indication of one or more application services to which the UE subscribes and may store an indication of those services in a context record for the UE, keyed to a UE identifier such as an International Mobile Subscriber Identity (IMSI) for instance. For each of various services, the MME may then allocate for the UE a respective bearer ID (e.g., evolved packet system (EPS) bearer ID), which the MME may store in the UE context record in correlation with an identity of the base station for instance. Further, for each such service, the MME then engage in signaling with the SGW 20 and the base station 12 to set up a respective bearer.

For instance, assuming the UE is authorized for general packet-data service, for instance, the MME may engage in signaling with the SGW 20 and the base station 12 to set up for the UE a default bearer to carry general packet-data communication traffic. Further, if the UE is authorized for VoIP service, the MME may also engage in signaling with the SGW and the base station to set up for the UE another default bearer to carry VoIP call setup signaling (e.g., SIP signaling). As discussed above, each of these bearers may have a corresponding level of service as discussed above, which might be keyed to a service level agreement of the UE for instance.

The process of establishing each of these or other bearers may take various forms, the particular details of which are not critical. In a representative implementation, for instance, the MME may transmit to the SGW a create-session request, including in the request one or more parameters (e.g., a quality of service class identifier (QCI) and/or an application service identifier) indicating the service level and/or other type of bearer to be established and identifying the UE at issue (e.g., by IMSI). The SGW may then responsively send a corresponding create-session request to the PGW 22. Upon receipt of the create-session request, the PGW may then query the PCRF 36 for authorization to establish the requested bearer for the UE, and the PCRF may respond with authorization and perhaps provide any applicable adjustments or directives regarding service level or other attributes of the bearer to be established.

With the PCRF's approval, the PGW may then record an access bearer ID for the UE and may work with the SGW to establish a communication tunnel corresponding with the bearer. In particular, the PGW may transmit to the SGW a create-session response indicating the bearer being established (e.g., providing a bearer ID, QCI, UE identifier, etc.) and informing the SGW of an endpoint identifier (e.g., port and/or address) at the PGW to be used for the bearer. The SGW may then transmit an acknowledgement to the PGW, similarly informing the PGW of an endpoint identifier at the SGW to be used for the bearer. In this manner, the PGW and SGW will establish a tunnel for communicating with each other at their respective endpoint identifiers, and each correlate that tunnel with the bearer at issue, including bearer type parameters such as service level for instance.

The SGW may then transmit to the MME a create-session response that provides any applicable service level parameters for the bearer and that informs the MME of an endpoint identifier at the SGW to be used for communication between the SGW and the base station. The MME may then transmit to the base station an attach-accept message, providing any applicable service level parameters for the bearer and informing the base station of the endpoint identifier at the SGW to be used for communication between the SGW and the base station.

Upon receipt of the attach-accept message from the MME, the base station may then transmit over the air interface 16 to the UE a Radio Resource Control (RRC) Connection Reconfiguration message that specifies a radio-bearer ID and any applicable service level parameters, as well as an attach-accept message. The UE may then store the bearer ID and any applicable parameters and send an RRC Connection Reconfiguration Complete message to the base station, indicating setup of the radio-bearer for air interface communication between the UE and the base station.

Further, the base station may transmit to the MME an attach-complete message, and the MME may transmit to the SGW a corresponding attach-complete message that informs the SGW of an endpoint identifier at the base station to be used for communication between the SGW and the base station. In this manner, the base station and SGW will have established a tunnel for communicating with each other at their respective endpoint identifiers, and each would correlate that tunnel with the bearer at issue, including bearer type parameters such as service level for instance.

Through this or another process, a bearer would thus be established for the UE, including a radio-bearer that extends over the air interface between the UE and the base station, and an access-bearer that extends between the base station and the SGW and between the SGW and the PGW. Each of the entities involved in communication over this bearer, including the UE, base station, SGW, and PGW for instance, may also maintain service level parameters for the bearer, so as to facilitate treating communications in an appropriate manner, such as with best-effort service level, guaranteed-bit-rate service level, or another service level for instance.

Beyond establishment of one or more default bearers for the UE, the network may also establish for the UE one or more other bearers. As noted above, for instance, if a VoIP call is to be set up for the UE, the network may establish for the UE a dedicated bearer for use to carry the VoIP traffic to and from the UE with an appropriate service level such as a sufficiently high guaranteed bit rate.

In practice, for instance, if the UE seeks to initiate a VoIP call, the UE may send to the base station an attach request seeking establishment of a guaranteed bit rate bearer for use to carry the VoIP traffic. In particular, the UE may include in such an attach request a QCI and/or application service identifier for VoIP service. Upon receipt of the attach request, the MME may then invoke a process such as that described above, to establish for the UE a dedicated bearer for use to carry VoIP traffic. In parallel with this bearer setup or after this bearer setup, the UE may then engage in SIP signaling with the IMS call server via the UE's default VoIP signaling bearer, to set up the VoIP call, and the UE may then engage in the call using the dedicated VoIP bearer to exchange VoIP call traffic.

On the other hand, when the IMS call server seeks to set up a VoIP call to the UE, the VoIP call server may transmit a signaling message to the PCRF 36, and the PCRF may then transmit to the PGW a policy update message directing the PGW to establish for the UE a dedicated VoIP bearer to carry the VoIP call traffic. And the PGW may responsively invoke a process to establish for the UE a dedicated VoIP bearer.

In particular, the PGW may the transmit to the SGW a create-bearer request and work with the SGW to establish a PGW-SGW tunnel for the bearer as discussed above. Further, the SGW may transmit to the MME a corresponding create-bearer request, and the MME may transmit to the base station a radio-bearer setup request or the like. The base station may then respond to that request by transmitting an RRC Connection Reconfiguration request to the UE to establish the radio-bearer as discussed above, and by transmitting a radio-bearer setup response message to the MME. And the MME may then send a create-bearer response to the SGW, to complete setup of a tunnel between the base station and the SGW.

Likewise, in parallel with this bearer setup or after this bearer setup, the IMS call server may engage in SIP signaling with the UE via the UE's default VoIP signaling bearer, to set up the VoIP call. And the UE may then engage in the call using the dedicated VoIP bearer to exchange VoIP call traffic.

As discussed above, the present method and corresponding apparatus or system provides for managing bearers by automatically releasing an existing bearer of a first type when a new bearer of a second type is established for the UE, and then when communication on the new bearer is finished, automatically releasing that new bearer and re-establishing for the UE a bearer of the first type. In an example scenario, this may involve automatically releasing a UE's default general packet-data bearer when setting up a dedicated VoIP bearer for the UE, and in response to determining that VoIP communication on the dedicated bearer has ended, not only releasing the dedicated bearer but automatically re-establishing for the UE a default general packet-data bearer.

Figure 2:
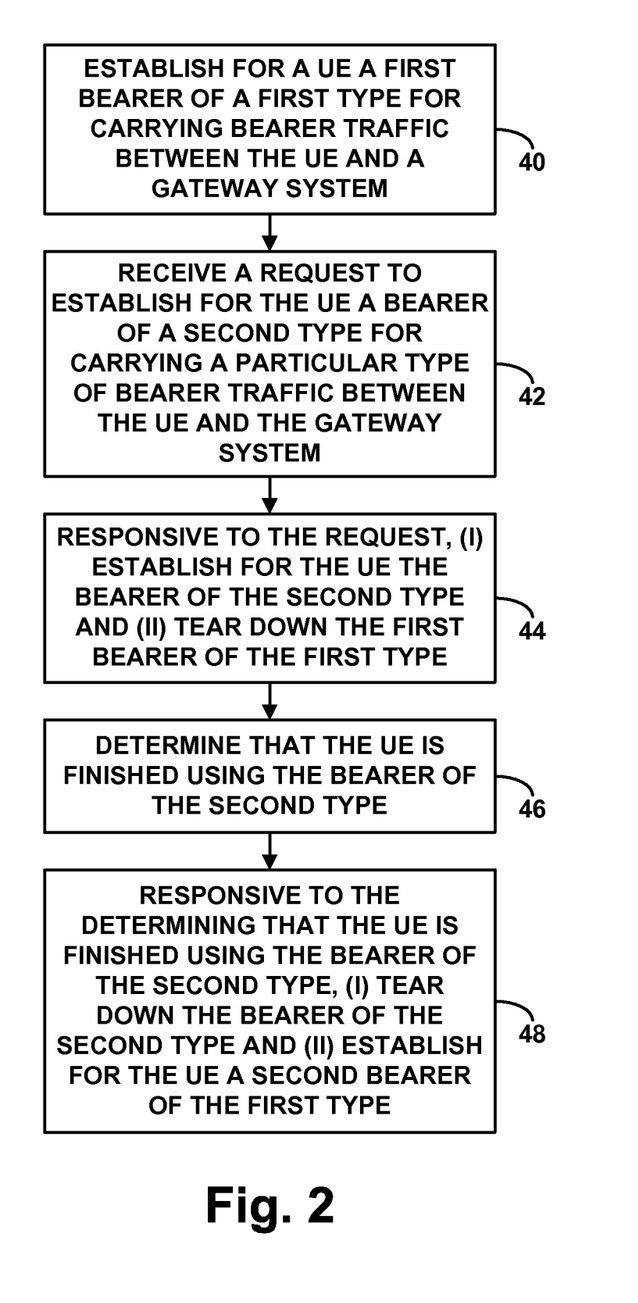
FIG. 2 is a flow chart depicting functions that can be carried out in accordance with the present disclosure.

FIG. 2 is a flow chart depicting functions that can be carried out in accordance with the present method. This method may be carried out in an arrangement such as that shown in FIG. 1, where a base station serves a UE over an air interface and is arranged to communicate with a gateway system that provides connectivity with a transport network. In this arrangement, the gateway system may include the SGW and PGW among possibly other entities, and the transport network may comprise the Internet or one or more other packet-switched networks. Functions of the method may be carried out by various entities of FIG. 1, such as by MME 32 possibly in cooperation with one or more other entities for instance.

As shown in FIG. 2, at block 40, the method involves establishing for a UE a first bearer of a first type for carrying bearer traffic between the UE and a gateway system. This first bearer of the first type could be a default general packet-data bearer having a best-effort service level, and the function of establishing the first bearer for the UE may occur at the time the UE first attaches with the base station and may proceed as described above. Thus, once this first bearer is established, the UE, base station, SGW, and PGW may have a record of the bearer correlated with applicable tunnels, so as to facilitate communication of bearer traffic between the UE and the PGW and ultimately communication of bearer traffic via the PGW with one or more entities on the transport network.

At block 42, the method next involves receiving a request to establish for the UE a bearer of a second type for carrying a particular type of bearer traffic between the UE and the gateway system. This bearer of the second type could be a dedicated bearer for use to carry VoIP traffic and may thus have a guaranteed bit rate and/or other high service level.

In normal operation, in response to receiving the request to establish the bearer of the second type, the network may simply establish the bearer of the second type as discussed above or in some other manner. In accordance with the method, however, the network will also automatically respond to the request to set up the bearer of the second type by tearing down the first bearer of the first type, thereby helping to conserve bearers. Thus, at block 44, the method involves, responsive to the request, (i) establishing for the UE the bearer of the second type and (ii) tearing down the first bearer of the first type.

In a scenario where the bearer of the second type is a dedicated bearer for use to carry VoIP traffic and the first bearer of the first type is default general packet-data bearer, the MME may tear down the first bearer of the first type further in response to determining that the UE is not authorized for or does not support simultaneous voice and data communication. In practice, for instance, the UE's service profile that the MME obtains from the HSS may specify that the UE does not have simultaneous voice and data service, and the MME may refer to that profile to make that determination and, in response, may tear down the UE's default general packet-data bearer when establishing for the UE the dedicated VoIP bearer.

The functions of establishing the bearer of the second type and tearing down the first bearer of the first type may be carried out in various ways. In one implementation, for instance, the functions could be carried out in parallel, by interspersing messaging to achieve one function with messaging to achieve the other function. And in another implementation, the functions may be conveniently integrated together, by integrating tear-down messaging for the first bearer of the first type with setup messaging for the bearer of the second type.

As an example of the second implementation, when the MME receives from the SGW a create-bearer request seeking to establish the bearer of the second type, the MME may transmit to the base station a radio-bearer setup request for the bearer of the second type and may include in that request one or more parameters that the base station would be programmed to interpret as a request to detach, release, delete, or otherwise tear down the first bearer of the first type. In turn, when the base station transmits to the UE the RRC Connection Reconfiguration request to establish the radio bearer for the bearer of the second type, the base station may similarly include in that request one or more parameters that the UE would be programmed to interpret as a request to detach, release, delete, or otherwise tear down the radio bearer of the first bearer of the first type.

The UE may thus release the radio-bearer that it had in place for the first bearer of the first type. Further, the UE may respond to the base station with an RRC Connection Reconfiguration complete message indicating completion of the radio bearer setup for the bearer of the second type, and may include in that message one or more parameters that the base station would be programmed to interpret as an acceptance of the request to tear down the radio bearer for the first bearer of the first type. The base station may then similarly release the radio-bearer that it had in place for the first bearer of the first type and may release the access bearer that it had in place for the first bearer of the first type. And the base station may transmit to the MME a radio-bearer setup response indicating completion of the radio bearer setup for the bearer of the second type, and may include in that message one or more parameters that the MME would be programmed to interpret as an acceptance of the request to tear down the first bearer of the first type.

In addition, perhaps in response to the MME receiving from the base station the radio-bearer setup response with the acceptance of the request to tear down the first bearer of the first type, the MME may transmit to the SGW a create-bearer response to complete setup of the access bearer between the SGW and base station for the bearer of the second type, and may include in that message one or more parameters that the SGW would be programmed to interpret as a request to detach, release, delete, or otherwise tear down the access-bearer that the SGW had for the first bearer of the first type. And the SGW may similarly send to the PGW a delete-bearer request or modify-bearer request to request tear down of the access-bearer that was in place between the SGW and PGW for the first bearer of the first type. The SGW may then transmit to the MME an acknowledgement that the access bearer for the first bearer of the first type has been released.

As a result of this process, when the network sets up the bearer of the second type for the UE, the network would also tear down the first bearer of the first type that had been established for the UE. Consequently, the network would conserve bearers.

Continuing with reference to FIG. 2, at block 46, the method then involves determining that the UE is finished using the bearer of the second type.

This function may take various forms as well. For example, the function may involve receiving from the application server system a signal indicating that the UE is finished communicating bearer traffic of the particular type and, responsive to the signal, providing to the gateway system a policy update indicating that the bearer of the second type will no longer be used.

More particularly, in the scenario where the bearer of the second type is a dedicated bearer for carrying VoIP traffic, this function may involve receiving a signal indicating that the VoIP call has ended, and may thus involve determining that the VoIP call has ended. In particular, when the VoIP call ends, the IMS server 30 may transmit a signal to via the proxy server 28 to the PCRF 36 indicating that the VoIP call has ended, to trigger teardown of the corresponding VoIP bearer. In response to receipt of that signal, the PCRF may then transmit to the PGW a policy update message that indicates the dedicated bearer is no longer in use, and the PGW may responsively transmit to the MME a delete-bearer request, requesting tear down of the dedicated bearer.

In normal operation, in response to determining that the UE is finished using the bearer of the second type, the network may simply tear down the bearer of the second type. For instance, the MME may transmit to the base station a radio-bearer release command to request release of the bearer of the second type, the base station may transmit to the UE an RRC Connection Reconfiguration message requesting the UE to release the bearer of the second type, the UE may respond with an RRC Connection Reconfiguration message to the base station, and the base station may respond with a radio-bearer release response to the MME, to tear down the radio-bearer for the bearer of the second type, and to tear down the access-bearer between the base station and the SGW for the bearer of the second type. Further, the MME may transmit to the SGW a delete-bearer response, to complete teardown of the access-bearer between the base station and the SGW for the bearer of the second type, and the SGW and PGW may engage in signaling with each other to tear down the access-bearer that they had in place for the bearer of the second type.

In accordance with the present method, however, not only will the network tear down the bearer of the second type, but the network will also automatically re-establish for the UE a second bearer of the first type. Thus, at block 48, the method involves, responsive to the determining that the UE is finished using the bearer of the second type, (i) tearing down the bearer of the second type and (ii) establishing for the UE a second bearer of the first type.

Here again, if the bearer of the second type is a dedicated bearer for use to carry VoIP traffic, the MME establish for the UE the second bearer of the first type in further response to determining that the UE is not authorized for or does not support simultaneous voice and data communication. In particular, upon receipt of a request from the PGW to delete the dedicated VoIP bearer, the MME may determine as above that the UE does not support simultaneous voice and data, which may mean that the MME had previously directed release of the UE's default general packet-data bearer when establishing for the UE the dedicated VoIP bearer. Consequently, in addition to tearing down the UE's dedicated VoIP bearer, the MME may re-establish for the UE a default general packet-data bearer.

The functions of tearing down the bearer of the second type and establishing the second bearer of the first type may be carried out in various ways. As with the process above, in one implementation, the functions could be carried out in parallel, by interspersing messaging to achieve one function with messaging to achieve the other function. And in another implementation, the functions may be conveniently integrated together, by integrating setup messaging for the second bearer of the first type with tear-down messaging for the bearer of the second type.

As an example of the first of these implementations, the MME may transmit to the SGW a create-session request and so forth as discussed above to establish the second bearer of the first type and may, in parallel, transmit to the base station a radio-bearer release command and so forth as discussed above to release the bearer of the second type. Upon receipt from the SGW of a create-session response for the second bearer of the first type, the MME may then transmit to the base station a bearer-setup request such as an initial context setup request, to further establish the second bearer of the first type. And upon receipt from the base station of a radio-bearer release response for the bearer of the second type, the MME may then transmit to the SGW a delete-bearer request to further release the bearer of the second type.

As a result of this and additional signaling, when the network tears down the bearer of the second type, the network would thus re-establish for the UE a bearer of the first type, so that the UE could continue to engage in communications appropriate for the bearer of the first type, such as general packet-data communications for instance.

Figure 3:
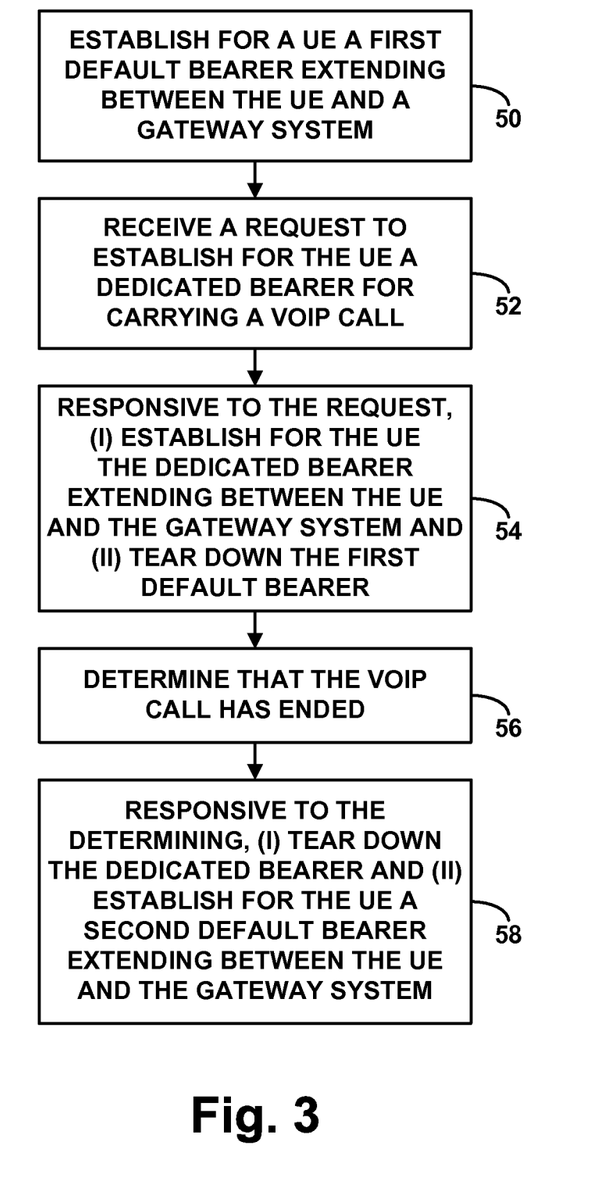
FIG. 3 is another flow chart depicting functions that can be carried out in accordance with the present disclosure.

FIG. 3 is next another flow chart depicting functions that can be carried out in accordance with the present method. As shown in FIG. 3, at block 50, the method involves establishing for a UE a first default bearer extending between the UE and a gateway system. At block 52, the method then involves receiving a request to establish for the UE a dedicated bearer for carrying a VoIP call. And at block 54, the method involves, responsive to the request, (i) establishing for the UE the dedicated bearer extending between the UE and the gateway system and (ii) tearing down the first default bearer. In turn, at block 56, the method involves determining that the VoIP call has ended. And at block 58, the method involves, responsive to the determining, (i) tearing down the dedicated bearer and (ii) establishing for the UE a second default bearer extending between the UE and the gateway system.

In line with the discussion above, the first default bearer and second default bearer may each of a first service level, and the dedicated bearer may have a second service level greater than the first service level. For instance, the first service level may be a best-effort service level, and the second service level may be a guaranteed-bit-rate service level.

Further the various functions may proceed in line with the discussion above. For example, the act of receiving the request to establish the dedicated bearer for the UE may involve receiving into an MME from the gateway system a create-bearer request. And the act of establishing the dedicated bearer and tearing down the first default bearer may involve (a) the MME transmitting to a base station serving the UE a dedicated-bearer setup request with a directive for the base station to tear down the first default bearer and (b) the MME transmitting to the gateway system a response to the create-bearer request with a directive for the gateway system to delete the default bearer.

As another example, the act of determining that the VoIP call has ended may involve receiving into a policy decision point such as a PCRF a message indicating that the VoIP call has ended. And the act of tearing down the dedicated bearer and establishing for the UE the second default bearer in response to the determining may involve (a) responsive to the message, the policy decision point signaling to the gateway system with a policy update indicating that the dedicated bearer is no longer needed, (b) the gateway system responding to the signaling from the policy decision point by signaling to the MME with a delete-bearer request, and (c) responsive to the delete-bearer request, (i) the MME transmitting to a base station serving the UE a dedicated-bearer release request and a request to set up the second default bearer and (ii) the MME transmitting to the gateway system a delete-bearer response and a request to set up the second default bearer.

Moreover, the act of establishing for the UE the dedicated bearer and tearing down the first default bearer may involve transmitting to a base station serving the UE a bearer-setup request containing a bearer-detach request, where the bearer-setup request requests setup of the dedicated bearer, and the bearer-detach request requests tear down of the first default bearer. And the act of tearing down the dedicated bearer and establishing the second default bearer may involve transmitting to a base station serving the UE a bearer-release message and an initial context setup request message, where the bearer-release message requests tear down of the dedicated bearer, and where the initial context setup request message requests setup of the second default bearer.

Figure 4:
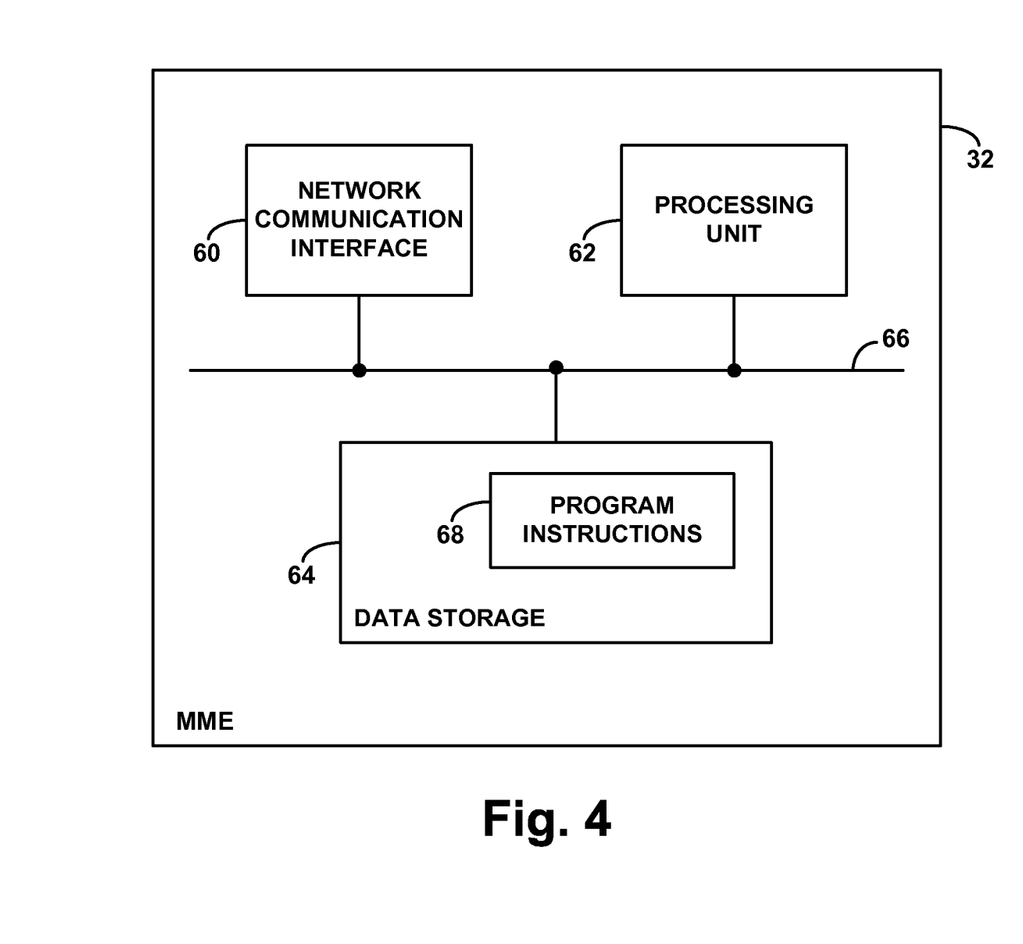
FIG. 4 is a simplified block diagram of a mobility management entity operable in the arrangement of FIG. 1.

Finally, FIG. 4 is a simplified block diagram of an MME that may implement functions of the present method. As shown in FIG. 4, the MME includes a network communication interface 60, a processing unit 62, and data storage 64, all of which may be communicatively linked together by a system bus, network, or other connection mechanism 66.

Network communication interface 60 functions to facilitate communication with various other network entities shown, such as base station 12, SGW 20, and HSS 32. As such, the interface 60 may include one or more network interface modules, such as Ethernet network interface modules for instance or may take any of a variety of other forms, supporting wireless and/or wired communication with these and other components.

Processing unit 62 may then comprise one or more general purpose processors (e.g., microprocessors) and/or one or more special purpose processors (e.g., application specific integrated circuits). And data storage 64 may comprise one or more volatile and/or non-volatile non-transitory storage components, such as optical, magnetic, or flash storage, and may be integrated in whole or in part with processing unit 62.

As shown, data storage 64 may hold program instructions 68 that are executable or interpretable by processing unit 62 to carry out various functions described herein. By way of example, these functions may include receiving via the network communication interface a first request to establish a dedicated bearer for a UE. And the functions may include, responsive to the first request, engaging in signaling via the network communication interface with one or more network entities to establish the dedicated bearer for the UE and to release a first default bearer that had been established for the UE. Further, the functions may include subsequently receiving via the network communication interface a second request to release the dedicated bearer. And the functions may include, responsive to the second request, engaging in signaling via the network communication interface with the one or more network entities to release the dedicated bearer and to establish for the UE a second default bearer.

Here again, these functions may be carried out in line with the discussion above or in other ways. And in a specific example implementation, the dedicated bearer may be a guaranteed-bit-rate bearer for a VoIP call, the act of receiving the second request may involve receiving the second request from a gateway system that provides connectivity between the UE and a packet-data network and through which the VoIP call passes, and the second request may be generated in response to the ending of the VoIP call.

Exemplary embodiments have been described above. Those skilled in the art will understand, however, that changes and modifications may be made to these embodiments without departing from the true scope and spirit of the invention.

We claim:

1. A method comprising:
    establishing for a user equipment device (UE) a first bearer of a first type for carrying bearer traffic between the UE and a gateway system, wherein the first bearer of the first type extends via a base station serving the UE;
    receiving a request to establish for the UE a bearer of a second type for carrying a particular type of bearer traffic between the UE and the gateway system;
    responsive to the request, (i) establishing for the UE the bearer of the second type, wherein the bearer of the second type extends via the base station serving the UE, and (ii) tearing down the first bearer of the first type;
    determining that the UE is finished using the bearer of the second type; and
    responsive to the determining that the UE is finished using the bearer of the second type, (i) tearing down the bearer of the second type and (ii) establishing for the UE a second bearer of the first type, wherein the second bearer of the first type extends via the base station serving the UE.

2. The method of claim 1, wherein the first type of bearer is a default bearer, and wherein the second type of bearer is a dedicated bearer.

3. The method of claim 2, wherein the particular type of bearer traffic is voice-over-Internet-Protocol (VoIP) traffic.

4. The method of claim 3, further comprising:
    determining that simultaneous voice and data is disabled for the UE,
    wherein tearing down the first bearer of the first type is further responsive to the determining that simultaneous voice and data is disabled for the UE.

5. The method of claim 3, further comprising:
    determining that simultaneous voice and data is disabled for the UE,
    wherein establishing the second bearer of the first type is further responsive to the determining that simultaneous voice and data is disabled for the UE.

6. The method of claim 1, wherein establishing for the UE the bearer of the second type and tearing down the first bearer of the first type comprises:
    transmitting to the base station serving the UE a bearer-setup request and a bearer-release request, wherein the bearer-setup request requests setup of the bearer of the second type, and wherein the bearer-release request requests tear down of the first bearer of the first type.

7. The method of claim 6, wherein transmitting the bearer-setup request and the bearer-release request comprises transmitting the bearer-setup request and including in the bearer-setup request at least one parameter defining the bearer-release request.

8. The method of claim 7, wherein determining that the UE is finished using the bearer of the second type comprises:
    receiving from an application server system a signal indicating that the UE is finished communicating the bearer traffic of the particular type; and
    responsive to the signal, providing to the gateway system a policy update indicating that the bearer of the second type will no longer be used.

9. The method of claim 1, wherein tearing down the bearer of the second type and establishing the second bearer of the first type comprises:

transmitting to the base station serving the UE a bearer-release request and a bearer-setup request, wherein the bearer-release request requests tear down of the bearer of the second type, and wherein the bearer-setup request requests setup of the second bearer of the first type.

10. A method comprising:

establishing for a user equipment device (UE) a first default bearer extending between the UE and a gateway system, wherein the first default bearer extends via a base station serving the UE;

receiving a request to establish for the UE a dedicated bearer for carrying a voice-over-Internet-Protocol (VoIP) call;

responsive to the request, (i) establishing for the UE the dedicated bearer extending between the UE and the gateway system, wherein the dedicated bearer extends via the base station serving the UE and (ii) tearing down the first default bearer; and determining that the VoIP call has ended; and responsive to the determining, (i) tearing down the dedicated bearer and (ii) establishing for the UE a second default bearer extending between the UE and the gateway system, wherein the second default bearer extends via the base station serving the UE.

11. The method of claim 10, wherein the first default bearer and second default bearer have a first service level, and the dedicated bearer has a second service level greater than the first service level.

12. The method of claim 10, wherein the first service level is a best-effort service level, and wherein the second service level is a guaranteed-bit-rate service level.

13. The method of claim 10, wherein receiving the request to establish the dedicated bearer for the UE comprises receiving a create-bearer request into a mobility management entity (MME) from the gateway system, and wherein establishing the dedicated bearer and tearing down the first default bearer comprises:

the MME transmitting to the base station serving the UE a dedicated-bearer setup request with a directive for the base station to tear down the first default bearer; and the MME transmitting to the gateway system a response to the create-bearer request with a directive for the gateway system to delete the default bearer.

14. The method of claim 10, wherein determining that the VoIP call has ended comprises receiving into a policy decision point a message indicating that the VoIP call has ended, and wherein tearing down the dedicated bearer and establishing for the UE the second default bearer in response to the determining comprises:

responsive to the message, the policy decision point signaling to the gateway system with a policy update indicating that the dedicated bearer is no longer needed;

the gateway system responding to the signaling from the policy decision point by signaling to a mobility management entity (MME) with a delete-bearer request; and responsive to the delete-bearer request, (i) the MME transmitting to the base station serving the UE a dedicated-bearer release request and a request to set up the second default bearer and (ii) the MME transmitting to the gateway system a delete-bearer response and a request to set up the second default bearer.

15. The method of claim 10, wherein establishing for the UE the dedicated bearer and tearing down the first default bearer comprises:

transmitting to the base station serving the UE a bearer-setup request containing a bearer-detach request, wherein the bearer-setup request requests setup of the dedicated bearer, and wherein the bearer-detach request requests tear down of the first default bearer.

16. The method of claim 10, wherein tearing down the dedicated bearer and establishing the second default bearer comprises:

transmitting to the base station serving the UE a bearer-release message and an initial context setup request message, wherein the bearer-release message requests tear down of the dedicated bearer, and wherein the initial context setup request message requests setup of the second default bearer.

17. A mobility management entity (MME) comprising:

a network communication interface;
a processing unit;
data storage;
program instructions stored in the data storage and executable by the processing unit to carry out functions comprising:

receiving via the network communication interface a first request to establish a dedicated bearer for a user equipment device (UE);

responsive to the first request, engaging in signaling via the network communication interface with one or more network entities to establish the dedicated bearer for the UE and to release a first default bearer that had been established for the UE, wherein the default bearer extended via a base station serving the UE, and wherein the dedicated bearer also extends via the base station serving the UE;

subsequently receiving via the network communication interface a second request to release the dedicated bearer; and responsive to the second request, engaging in signaling via the network communication interface with the one or more network entities to release the dedicated bearer and to establish for the UE a second default bearer, wherein the second default bearer also extends via the base station serving the UE.

18. The MME of claim 17, wherein the dedicated bearer is a guaranteed-bit-rate bearer for a voice-over-Internet-Protocol (VoIP) call.

19. The MME of claim 18, wherein receiving the second request comprises receiving the second request from a gateway system that provides connectivity between the UE and a packet-data network and through which the VoIP call passes.

20. The MME of claim 19, wherein the second request is generated in response to ending of the VoIP call.

* * * * *